(12) United States Patent
Ende

(10) Patent No.: US 6,412,179 B1
(45) Date of Patent: Jul. 2, 2002

(54) CUTTING GUIDE APPARATUS FOR GUIDING PORTABLE POWER CUTTING TOOLS

(76) Inventor: Mathias Am Ende, 11946 Avon Way, No. 5, Los Angeles, CA (US) 90066

( * ) Notice: Subject to any disclaimer, the term of this patent is extended or adjusted under 35 U.S.C. 154(b) by 74 days.

(21) Appl. No.: 09/643,568

(22) Filed: Aug. 22, 2000

(51) Int. Cl.⁷ .............................. B23D 47/02; B27B 9/04
(52) U.S. Cl. ........................................................ 30/374
(58) Field of Search ........................ 30/371, 373, 374, 30/375, 505; 83/487, 761, 762, 765

(56) References Cited

U.S. PATENT DOCUMENTS

| | | | | |
|---|---|---|---|---|
| 2,346,961 A | * | 4/1944 | Gundelfinger et al. .... | 30/373 X |
| 2,800,933 A | * | 7/1957 | Michael ........................ | 30/373 |
| 3,092,156 A | * | 6/1963 | Hayden ........................ | 30/371 |
| 3,481,374 A | * | 12/1969 | Schindler ..................... | 30/373 |
| 3,839,789 A | * | 10/1974 | Vlakosky ..................... | 30/374 |
| 3,903,774 A | * | 9/1975 | Stinson ..................... | 30/371 X |
| 4,016,649 A | * | 4/1977 | Kloster ..................... | 30/373 X |
| 4,777,726 A | * | 10/1988 | Flowers ........................ | 30/374 |
| 4,876,793 A | * | 10/1989 | Quaglia ..................... | 30/373 X |
| 4,903,680 A | * | 2/1990 | Chiuminatta et al. ..... | 30/373 X |
| 4,913,204 A | * | 4/1990 | Moores et al. ............. | 30/374 X |
| 4,942,912 A | * | 7/1990 | Gakhar et al. ............. | 30/373 X |
| 5,084,977 A | * | 2/1992 | Perkins ........................ | 30/374 |
| 5,243,891 A | * | 9/1993 | Smith, Jr. .................. | 30/374 X |
| 5,333,385 A | * | 8/1994 | Chou .......................... | 30/371 |
| 5,561,907 A | * | 10/1996 | Campbell et al. ............. | 30/371 |
| 5,566,456 A | * | 10/1996 | Sawyer, Jr. .................. | 30/374 |
| 5,651,182 A | * | 7/1997 | Kim et al. ..................... | 30/373 |
| 5,675,898 A | * | 10/1997 | Kalber et al. .................. | 30/374 |
| 5,815,933 A | * | 10/1998 | Staniszewski ............. | 30/374 X |
| 5,941,227 A | * | 8/1999 | Bearden ..................... | 30/371 X |
| 6,067,716 A | * | 5/2000 | Carter .......................... | 30/92 |
| 6,205,897 B1 | * | 3/2001 | Carter ..................... | 30/371 X |

* cited by examiner

*Primary Examiner*—Charles Goodman
(74) *Attorney, Agent, or Firm*—Thomas I. Rozsa; Tony D. Chen

(57) ABSTRACT

A cutting guide apparatus for use with a portable power cutting tool and including a guide base plate, locking mechanism for removably attaching the cutting guide apparatus to an upper blade guard of the cutting tool, and a control mechanism to control the position of the tool relative to a planar workpiece. The control mechanism includes a slidable member and is slidably disposed on a track which is attached on the guide base plate and moves along the direction of the cut to guide the cutting tool throughout the cutting process. The control mechanism further includes an abutment guide member for abutting against the workpiece to maintain the cutting tool in an accurate cutting position during the cutting process. The abutment guide member is pivotably connected to the slidable member such that when the slidable member has reached the end of the track, the abutment guide member is pivoted upwardly to slide along the upper surface of the workpiece so that the base plate and the cutting tool can continue the cutting process if required. The control mechanism further includes an elastic spring for providing tension so that the slidable member can be returned to its initial position after the cutting process is completed.

29 Claims, 5 Drawing Sheets

CUTTING GUIDE APPARATUS FOR GUIDING PORTABLE POWER CUTTING TOOLS

BACKGROUND OF THE INVENTION

1. Field of the Invention

The present invention relates generally to the field of power cutting tools. More particularly, the present invention relates to the field of cutting guides for accurately guiding a cutting tool to move in an unerring linear direction as it cuts a substantially planar workpiece.

2. Description of the Prior Art

Currently, the use of a square is necessary to mark straight cuts on 2×4 pieces of lumber or similar sized lumber during construction. The disadvantage with using the square is that it requires a time consuming two-step process.

It is highly desirable to have a very efficient and also very effective design and construction of a cutting guide apparatus for a portable power cutting tool to control the direction of the cutting tool in a direction parallel to an edge of the workpiece. It is further desirable to provide a cutting guide apparatus which has the capability of being detachably connected to a conventional power cutting tool, where the cutting guide apparatus automatically places the power cutting tool in a precise correct cutting position to achieve an accurate cut every time to expedite the framing process during construction projects or other cutting processes.

SUMMARY OF THE INVENTION

The present invention is a novel and unique cutting guide apparatus for use with a portable power cutting tool.

The cutting guide apparatus includes a guide base plate, locking and mounting means for removably attaching the cutting guide apparatus to an upper blade guard of the cutting tool, and means to control the position of the tool relative to a planar workpiece. The control means includes a slidable means which is slidably disposed on track means affixed on the guide base plate and moves along the direction of the cut to guide the cutting tool throughout the cutting process. The control means further includes an abutment guide member for abutting against the workpiece to maintain the cutting tool in a precise cutting position during the cutting process. The abutment guide member is pivotably connected to the slidable means such that when the slidable means has reached the end of the track means, the abutment guide member can be pivoted upwardly to slide along the upper surface of the workpiece so that the guide base plate and the cutting tool can continue the cutting process, if required. The control means further includes elastic means for providing tension so that the slidable means can be returned to its initial position after the cutting process is completed.

It is an object of the present invention to provide a cutting guide apparatus adaptable to fit virtually any commercially available power cutting tool.

It is an additional object of the present invention to provide a cutting guide apparatus to be used in conjunction with a power cutting tool and which automatically places the power cutting tool in a precise correct cutting position to achieve an accurate cut every time to expedite the cutting process of a workpiece.

It is a further object of the present invention to provide a cutting guide apparatus to be used in conjunction with a power cutting tool and which is specially designed to expedite the framing process during the construction process.

Described briefly in general terms, the present invention is a simple, easy to install cutting guide apparatus for accurately guiding the direction of movement of the power cutting tool in a linear direction as it cuts a substantially planar workpiece. The cutting guide apparatus is available to be removably attached to a conventional power tool as a single, preassembled unit, such that no further assembly is required on the part of the user. Accordingly, the cutting guide apparatus of the present invention may be installed in a few minutes.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not imitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
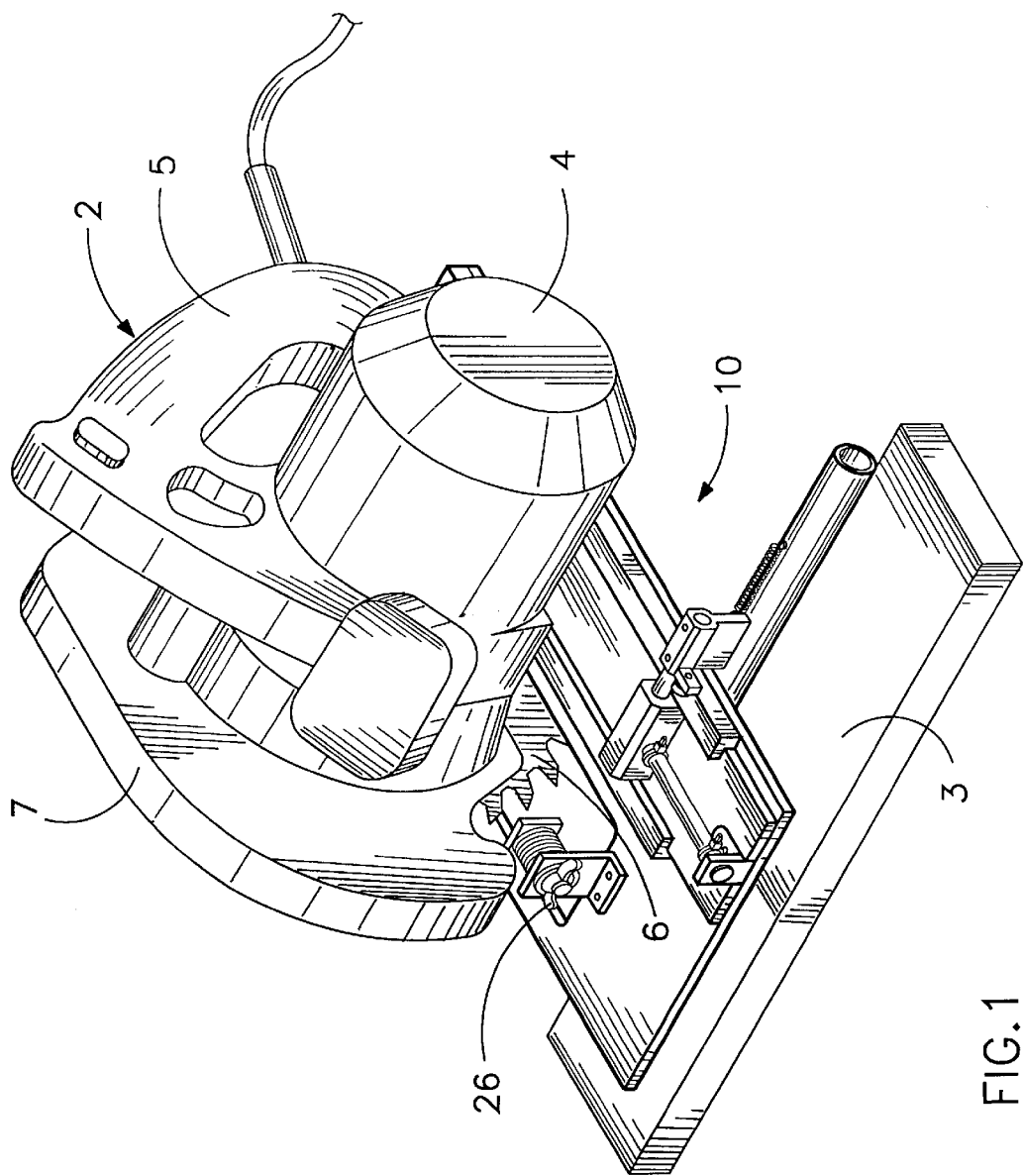
FIG. 1 is a perspective view of a conventional circular power saw tool which is attached to the present invention cutting guide apparatus.
Figure 2:
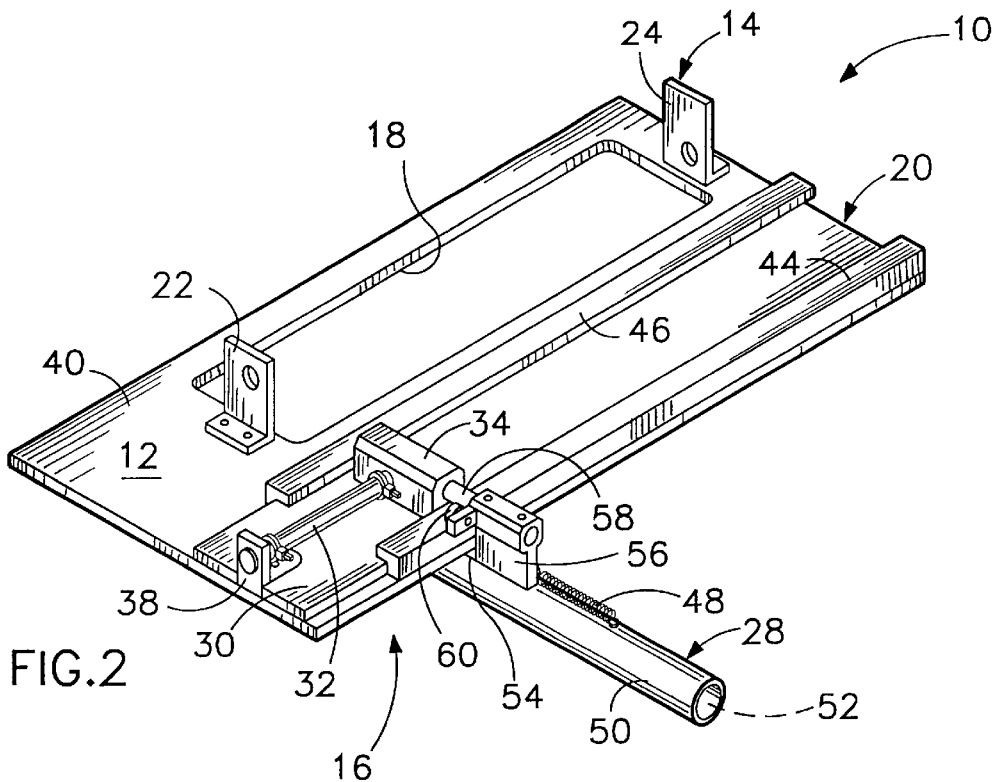
FIG. 2 is a perspective view of the present invention cutting guide apparatus, showing the apparatus in its ready state or initial position before cutting the workpiece.
Figure 3:
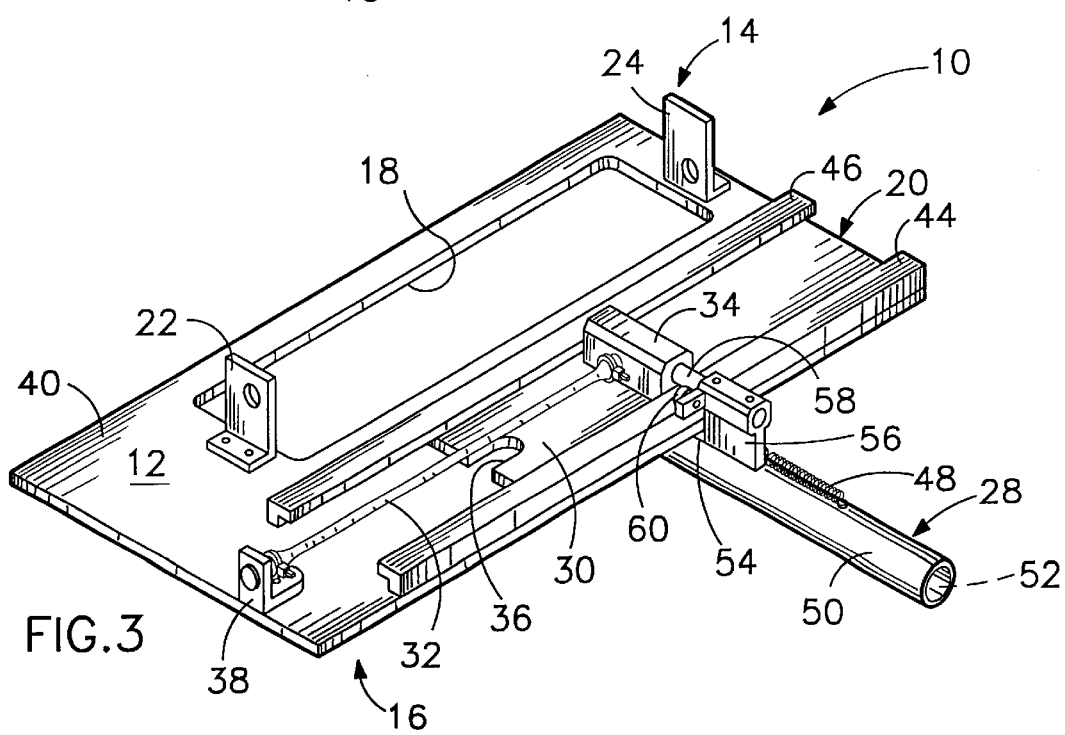
FIG. 3 is a perspective view of the present invention cutting guide apparatus, showing the abutment guide member and the slidable plate moved to a middle location on the apparatus.
Figure 4:
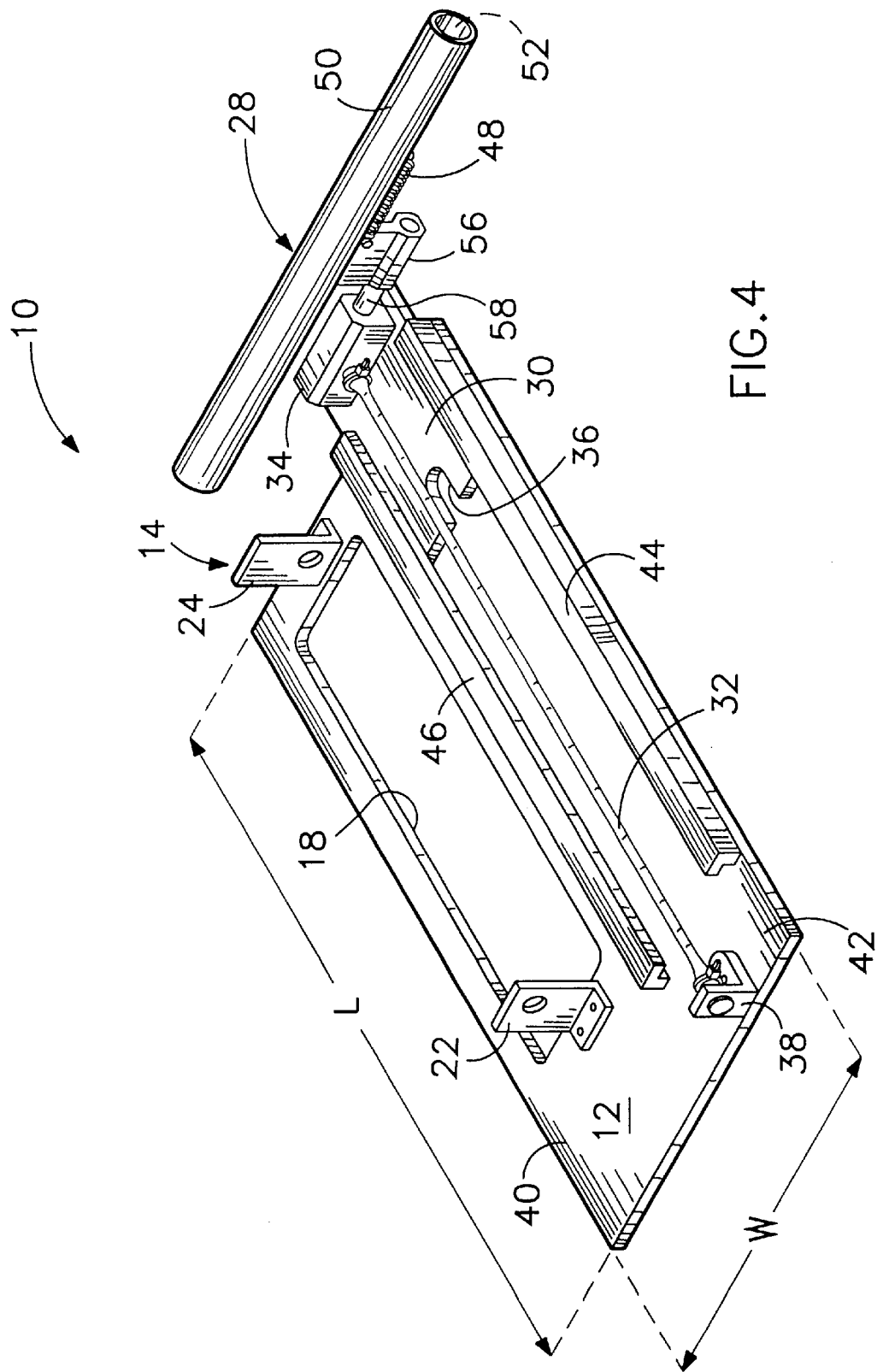
FIG. 4 is a perspective view of the present invention cutting guide apparatus, showing the abutment guide member and the slidable plate at the end of the track and the abutment guide member being flipped over so that the cutting tool can further cut the workpiece without using the cutting guide apparatus.
Figure 5:
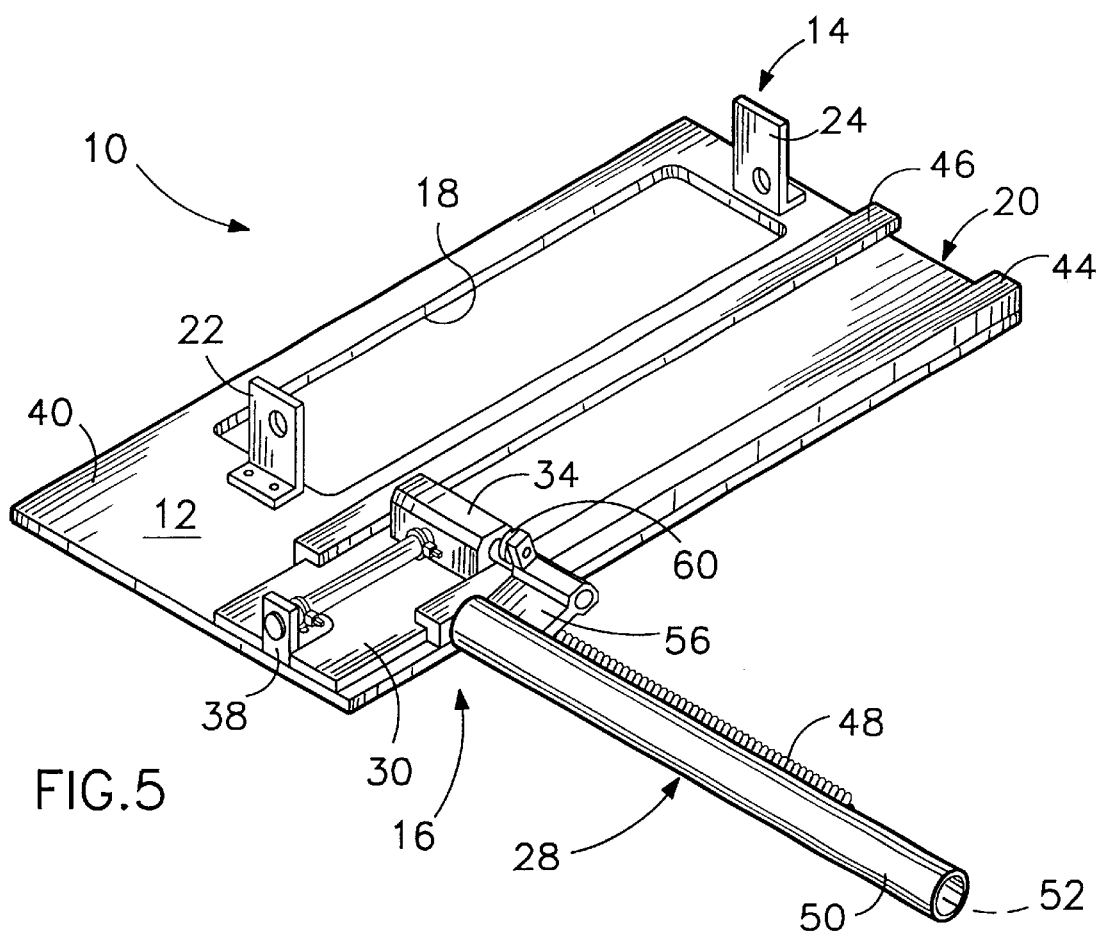
FIG. 5 is a perspective view of the present invention cutting guide apparatus, showing the cutting guide retracted in an inoperative position.

Referring to FIG. 1, there is shown at 10 the present invention cutting guide apparatus for controlling the direction in which a conventional portable power cutting tool 2 is moved to cut a planar workpiece 3. FIG. 1 discloses the portable cutting tool such as a portable circular saw 2 having the cutting guide apparatus 10 attached thereto. Since the portable circular saw 2 is of conventional design and well known in the art, it will not be described in detail. Briefly, however, the portable saw 2 includes a motor housing 4, a carrying handle 5, a circular cutting blade 6, and a rotatable safety guard 7.

It will be appreciated that the present invention is not limited to the portable power circular saw 2 shown in FIG. 1. It is emphasized that while the portable power circular saw is the preferred tool, it is also within the spirit and scope of the present invention to utilize other types of portable power tools, including, but not limited to, jigsaws, routers, etc., having different cutting instruments.

Referring to FIGS. 1 through 6, the details of the cutting guide apparatus 10 which forms the present invention are now described. The cutting guide apparatus 10 includes a generally elongated rectangular shaped guide base plate 12, locking and mounting means 14 for removably attaching the cutting guide apparatus 10 to the blade guard 7 of the circular saw 2 and means to control the position of the circular saw 2 relative to the planar workpiece 3. In the assembled relationship with the portable saw 2, the guide base plate 12 is positioned such that the cutting guide apparatus 10 will not interfere with the cutting blade 6.

The guide base plate 12 has a generally rectangular shaped opening 18 located on one side 40 and extends in a lengthwise direction for accommodating the cutting blade 6. Track means 20 is provided with the guide plate 12 and is affixed on the other side 42 and parallel to the rectangular shaped opening 18 for the straight, linear guidance of the guide base plate 12 and the circular saw 2. The track means 20 includes a pair of elongated spaced apart upside-down "L" shaped rails 44 and 46, and located parallel to each other. The "L" shaped rail 44 is located adjacent to the side edge of the guide base plate 12 while the "L" shaped rail 46 is located adjacent to the opening 18. The horizontal leg of each "L" shaped rail extends inwardly and faces each other. The tip of the vertical leg of each "L" shaped rail is affixed to the top surface of the guide base plate 12. The guide base plate 12 may have rounded comers and cutouts for reducing the weight and cost of the apparatus 10.

Referring to FIGS. 1 through 5, the locking and mounting means 14 includes a pair of mounting flanges 22 and 24 which are affixed to the top surface of the guide base plate 12 and extend upwardly and perpendicularly to the guide base plate 12. The mounting flanges 22 and 24 are centrally located at opposite ends of the guide base plate 12 and adjacent to the ends of the rectangular shaped opening 18. The circular saw 2 is removably mounted to the cutting guide apparatus 10 such that the safety guard 7 is attached between the pair of mounting flanges 22 and 24, and held thereto by wing nuts 26 (only one is shown, see FIG. 1) which are threadedly engaged with threaded means extending through apertures of the mounting flanges 22 and 24. The cutting blade 6 extends within the opening 18 provided on the guide plate 12. The cutting blade 6 which extends through the opening 18 can be adjusted in the horizontal direction by loosening the wing nuts 26 and moving the blade 6 in an up or down direction to the desired position and then the wing nuts 26 are retightened to secured the blade 6.

The control means 16 located on the other side 42 of the guide base plate 12 includes a slidable plate 30 which is slidably disposed on the track means 20 and held thereto by the "L" shaped rails 44 and 46. The slidable plate 30 has a U-shaped recess 36 located at the front end and an attachment block 34 located at the rear end, where the attachment block 34 is attached to the upper surface of the slidable plate 30. The U-shaped recess 36 is arranged in spaced axial alignment with an attachment post 38 which is affixed to the upper surface of the guide base plate 12. The attachment post 38 has a U-shaped bottom which corresponds to the U-shaped recess of the slidable plate 30.

The control means 16 further includes an elongated abutment guide member 28 for abutting against the workpiece 3 to maintain the circular saw 2 in an accurate cutting position during the cutting process. The abutment guide member 28 includes an outer cylindrical sleeve 50 and an inner slidable rod 52 which is slidably disposed within the sleeve 50. The outer cylindrical sleeve 50 has a slit 54 that extends from a middle portion of the sleeve 50 to one end of the sleeve. The inner slidable rod 52 has a protruding member 56 which extends upwardly through the slit 54 and is biased inwardly against the side edge of the guide base plate 12 by a coil spring means 48. The coil spring means 48 holds the abutment guide member 28 in both an operative condition (see FIGS. 1, 2, 3 and 6) and an inoperative condition (see FIG. 5). A pivot bridge 58 pivotably connects the protruding member 56 to a side of the attachment block 34 of the slidable plate 30. This pivot bridge 58 allows the abutment guide member 28 to pivot upwardly when the cut exceeds the length of the track means 20 (see FIG. 4), such that the abutment guide member 28 will slide along the workpiece and allows the guide base plate 12 and the portable saw 2 to continue the cutting process on the workpiece 3. There is provided a bearing 60 which is affixed underneath the pivot bridge 58. The bearing 60 engages with the top surface of the L-shaped rail 44 to hold the abutment guide member 28 in position. The abutment guide member 28 may also slide on the bottom of the base plate 12 in perfect working position. The bearing 60 also assists in the precise movement of the slidable plate 30 along the track means 20. The abutment guide member 28 can slide on the bottom of the guide base plate 12 and does not require the bearing 60.

The control means 16 further includes elastic means 32, such as a rubber spring or coil spring for providing tension so that the slidable means 30 can be automatically returned to its initial or starting position after each cut. The elastic means 32 is connected between protruding bosses of the attachment post 38 and the attachment block 34 for maintaining the abutment guide member 28 under constant tension in order to maintain the correct position for the circular saw 2.

It will be appreciated that the present invention is not limited to the elastic means 32 as shown. It is emphasized that while the elastic means 32 is preferred, it is also within the spirit and scope of the present invention to utilize other types of returning mechanisms to automatically return the slidable means 30 back to its initial or starting position after each cut.

It will be appreciated that the track means 20 and the abutment guide member 28 can be designed differently. By way of example, rods with a sleeve slide, strings with a sleeve slide, and roll edges or glides with a slide (see FIGS. 7 and 8). In addition, the pivot bridge 58 can be designed with an adjustable clamp to hold the abutment guide member 28 in different angles, i.e., a 45° angle to cut the workpiece. The pivot bridge 58 can be two pivot bridges for more guide stability. The pivot bridge 58 can be replaced with two flat round plates which turn on a special screw against each other to control the abutment guide member movement from the slidable plate. Furthermore, the slidable plate can be a frame with precise edges or wheels for gliding or rolling in the track means. It can be one or more sleeves for gliding on rods or strings. The abutment guide member can be shaped in different configurations. The abutment guide member can be placed in an inoperative position in the back or side of the guide base plate. The abutment guide member may have spikes to place the guide member in an exact position. The abutment guide member may be set in position by holding the blade still to mark a spot and then expose the spikes into the workpiece by a lever to fix the saw to the exact position.

Figure 6:
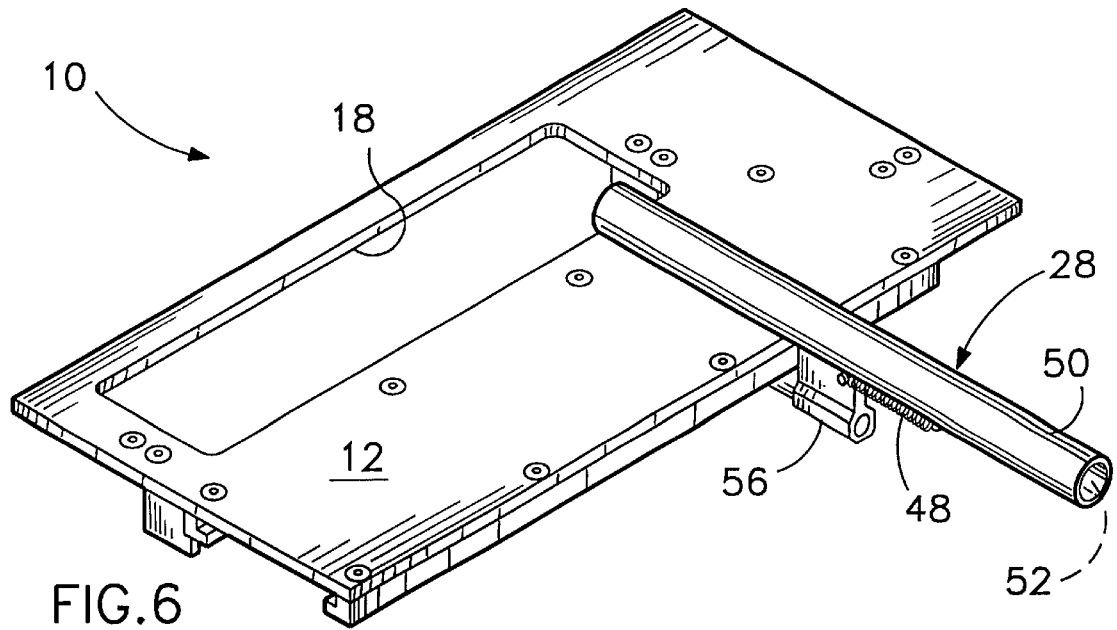
FIG. 6 is a rear perspective view of the present invention cutting guide apparatus.

The abutment guide member 28 is located in a transverse direction and partially extends outwardly from the side of the guide base plate 12 and also extends underneath the guide base plate 12 (see FIG. 6). As the saw 2 is moved to cut the workpiece, the guide base plate 12 is correspondingly moved along with the saw 2. The abutment guide member 28 remains stationary along the side of the workpiece 3 to enhance the accuracy of the cut by causing the cutting blade 6 to move in a line that runs perpendicular to the side of the workpiece 3 so that the width of the cut off piece will be uniform. The guide base plate 12 moves with the saw 2 to cut the workpiece such that the abutment guide member 28 will not move with saw 2. So long as the abutment guide member 28 remains flush against the side of the workpiece 3 (see FIG. 1), the transverse path along which the circular saw 2 moves to cut the workpiece 3 will at all times be aligned perpendicular to the side of the workpiece 3. Hence, as the circular saw 2 is moved along the workpiece to make a cut, the position of the abutment guide member 28 relative to the workpiece will not change. The position of the abutment guide member 28 is stationary because of the engagement against the side of the workpiece.

By way of example, the overall length L and width W of the guide cutting apparatus 10 are approximately 11½ inches and 6 inches respectively. It will be appreciated that the dimensions described above are merely one illustrative embodiment and can include many other comparable sets of dimensions.

Figure 7:
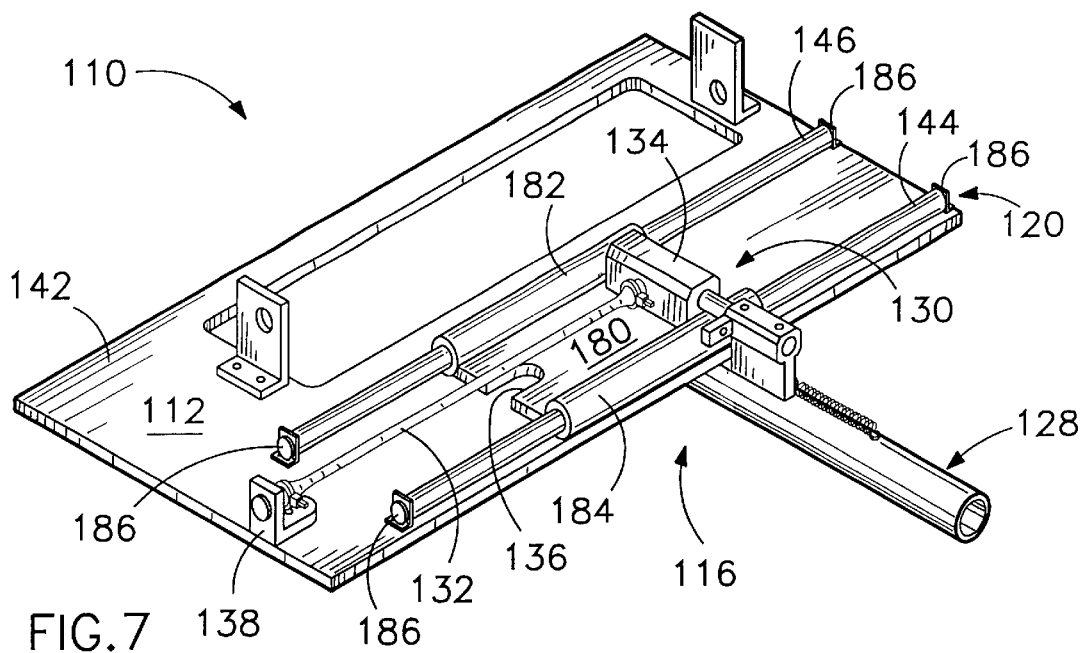
FIG. 7 is a perspective view of an alternative embodiment of the present invention cutting guide apparatus, showing the abutment guide member and the slidable means moved to a middle location on the apparatus.

Referring to FIG. 7, there is shown at 110 an alternative embodiment of the present invention which is very similar to the preferred embodiment just discussed and the only difference is the nature and configuration of the control means 116. All of the parts of the alternative embodiment cutting guide apparatus 110 are numbered correspondingly with 100 added to each number.

The control means 116 located on the other side 142 of the guide base plate 112 includes a slidable means 130 which is slidably disposed on the track means 120 and held thereto by a pair of spaced apart elongated rods 144 and 146. The elongated rods 144 and 146 are parallel to each other and held above the guide base plate 112 by a pair of flanges 186 located at opposite ends of each elongated rod. The flanges 186 are affixed to the guide base plate 112 by conventional means. The slidable means 130 includes a middle plate member 180 and two hollow cylindrical sleeves 182 and 184 attached on opposite sides of the plate member 180. The two cylindrical sleeves 182 and 184 are installed on and enclose the rods 144 and 146. The slidable means 130 may have a U-shaped recess 136 located at the front end and an attachment block 134 located at the rear end, where the attachment block 134 is attached to the upper surface of the plate member 180. The U-shaped recess 136 is arranged in spaced axial alignment with an attachment post 138 which is affixed to the upper surface of the guide base plate 112. The attachment post 138 has a U-shaped bottom which corresponds to the U-shaped recess of the slidable means 130. In this embodiment, the bearing 60 shown in FIGS. 1 through 6 may not be required.

The control means 116 further includes an elongated abutment guide member 128 and elastic means 132 which is similar to the preceding embodiment, and the description thereof will not be repeated. Therefore, the slidable means 130 slides along and between the rods 144 and 146 of the track means 120.

Figure 8:
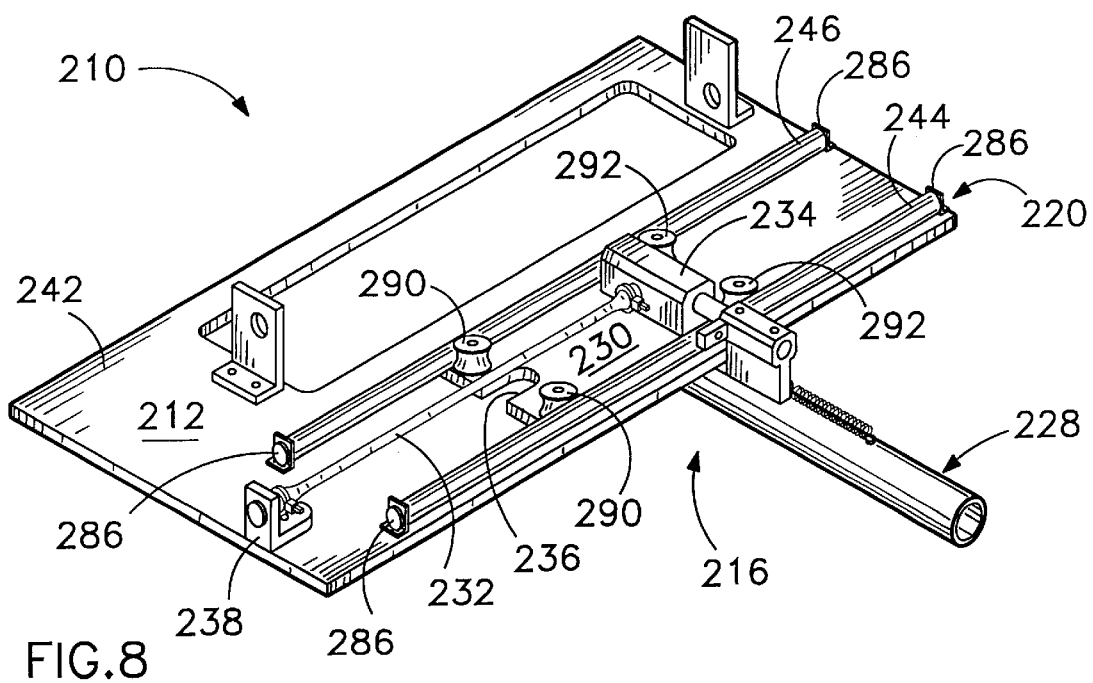
FIG. 8 is a perspective view of another alternative embodiment of the present invention cutting guide apparatus, showing the abutment guide member and the slidable means moved to a middle location on the apparatus.

Referring to FIG. 8, there is shown at 210 another alternative embodiment of the present invention which is very similar to the preferred embodiment discussed above and the only difference is the nature and configuration of the control means 216. All of the parts of this alternative embodiment are numbered correspondingly with 200 added to each number.

The control means 216 located on the other side 242 of the guide base plate 212 includes a slidable plate 230 which is slidably disposed on the track means 220 and held thereto by a pair of spaced apart elongated rods or rails 244 and 246. The elongated rods 244 and 246 are parallel to each other and held above the guide base plate 212 by a pair of flanges 286 located at opposite ends of each elongated rod. The flanges 286 are affixed to the guide base plate 212 by conventional means. There is provided a pair of spaced apart front wheel rims 290 and a pair of spaced apart rear wheel rims 292. The wheel rims 290 and 292 are affixed to the upper surface of the slidable plate 230, where the wheel rims 290 and 292 are respectively engaged with the elongated rods 244 and 246. The slidable plate 230 may have a U-shaped recess 236 located at the front end and an attachment block 234 located at the rear end, where the attachment block 234 is attached to the upper surface of the slidable plate 230. The U-shaped recess 236 is arranged in spaced axial alignment with an attachment post 238 which is affixed to the upper surface of the guide base plate 212. The attachment post 238 has a U-shaped bottom which corresponds to the U-shaped recess of the slidable plate 230. In this embodiment, the bearing 60 shown in FIGS. 1 through 6 may or may not be required.

The control means 216 further includes an elongated abutment guide member 228 and elastic means 232 which is similar to the preceding embodiment, and the description thereof will not be repeated. Therefore, the slidable plate 230 slides along and between the rods 244 and 246 of the track means 220.

The present invention conforms to conventional forms of manufacture or any other conventional way known to one skilled in the art. By way of example, the cutting guide apparatus can be made of malleable metal material, plastic material, carbon fiber, acrylics or any other suitable material. By way of example, the cutting guide apparatus may be made of plastic material. The manufacturing process which could accommodate the construction of the plastic cutting guide apparatus may be injection, thermoform, etc. or other molding process.

Defined in detail, the present invention is a cutting guide apparatus for guiding a portable circular saw in a cutting process to cut a substantially planar workpiece having at least one side and at least one end, the cutting guide apparatus comprising: (a) a substantially rectangular shaped guide base plate having a rectangular shaped opening on one side for accommodating a cutting blade of the circular saw; (b) a pair of spaced apart guide rails affixed on the other side of the guide base plate and located parallel in a lengthwise direction to the rectangular shaped opening; (c) locking and mounting means to releasably attach the guide base plate to the portable circular saw such that the cutting blade of the circular saw extends downwardly through the rectangular shaped opening; (d) a slidable plate slidably disposed between the pair of guide rails and moving along the direction of the cut to guide the circular saw throughout the cutting process for cutting the workpiece; (e) an elongated abutment guide member pivotably connected to the slidable plate and having an outer sleeve and an inner rod slidably disposed within the outer sleeve, where the abutment guide member can be positioned in an operative position for abutting against the at least one side of the workpiece and partially positioned underneath the guide base plate to maintain the circular saw in a precise cutting position during the cutting process and in an inoperative position when the precise cutting position is not required, the abutment guide member pivotable upwardly when the cut exceeds the length of the pair of guide rails such that the abutment guide member slides along the workpiece and further allows the guide base plate and the circular saw to continue the cutting process on the workpiece; (f) means for holding the abutment guide member in both the operative position and the inoperative position; and (g) means for providing tension so that the slidable plate is returned to its initial position after each cutting process on the workpiece is completed; (h) whereby the cutting guide apparatus automatically places the circular saw in the precise cutting position to achieve an accurate cut every time to expedite the cutting process on the workpiece.

Defined broadly, the present invention is a cutting guide apparatus for guiding a portable cutting tool in a cutting process to cut a workpiece, the cutting guide apparatus comprising: (a) a guide base plate having an opening on one side for accommodating a cutting blade of the cutting tool; (b) track means affixed on the other side of the guide base plate and located adjacent to the opening and parallel to a lengthwise direction of the guide base plate; (c) locking and mounting means to releasably attach the guide base plate to the cutting tool such that the cutting blade of the cutting tool extends downwardly through the opening; (d) slidable means slidably disposed on the track means and moving along the direction of the cut to guide the cutting tool throughout the cutting process for cutting the workpiece; (e) an abutment guide member pivotably connected to the slidable means for abutting against the workpiece and partially positioned underneath the guide base plate to maintain the cutting tool in a precise cutting position during the cutting process, the abutment guide member pivotable upwardly when the cut exceeds the length of the track means such that the abutment guide member slides along the workpiece and further allows the guide base plate and the cutting tool to continue the cutting process on the workpiece; and (f) means for providing tension so that the slidable means is returned to its initial position after each cutting process on the workpiece is completed; (g) whereby the cutting guide apparatus automatically places the cutting tool in the precise cutting position to achieve an accurate cut every time to expedite the cutting process on the workpiece.

Defined more broadly, the present invention is a cutting guide apparatus for guiding a cutting tool in a cutting process to cut a workpiece, the apparatus comprising: (a) a base plate having an opening therethrough for accommodating a cutting blade of the cutting tool; (b) track means affixed on the base plate and located adjacent to the opening; (c) mounting means to releasably attach the base plate to the cutting tool such that the cutting blade of the cutting tool extends downwardly through the opening; (d) slidable means slidably disposed on the track means and moving along the direction of the cut to guide the cutting tool throughout the cutting process for cutting the workpiece; (e) an abutment member pivotably connected to the slidable means for abutting against the workpiece and partially positioned underneath the base plate to maintain the cutting tool in a precise cutting position during the cutting process, the abutment member pivotable upwardly when the cut exceeds the length of the track means such that the abutment member slides along the workpiece and further allows the base plate and the cutting tool to continue the cutting process on the workpiece; and (f) means for providing tension so that the slidable means is returned to its initial position after each cutting process on the workpiece is completed; (g) whereby the cutting guide apparatus automatically places the cutting tool in the precise cutting position to achieve an accurate cut every time to expedite the cutting process on the workpiece.

Defined alternatively in detail, the present invention is a cutting guide apparatus for guiding a portable cutting tool in a cutting process to cut a workpiece, the cutting guide apparatus comprising: (a) a guide base plate having an opening on one side for accommodating a cutting blade of the cutting tool; (b) a pair of guide rails affixed on the other side of the guide base plate and located parallel in a lengthwise direction to the opening and spaced above the guide base plate; (c) locking and mounting means to releasably attach the guide base plate to the cutting tool such that the cutting blade of the cutting tool extends downwardly through the opening; (d) slidable means having a plate and two sleeves attached on opposite sides of the plate, the slidable means slidably disposed between the pair of guide rails such that the two sleeves respectively install on and surround the pair of guide rails, where two sleeves slide on the pair of guide rails and the slidable means moving along the direction of the cut to guide the cutting tool throughout the cutting process for cutting the workpiece; (e) an abutment member pivotably connected to the slidable means for abutting against the workpiece and partially positioned underneath the guide base plate to maintain the cutting tool in a precise cutting position during the cutting process, the abutment member pivotable upwardly when the cut exceeds the length of the pair of guide rails such that the abutment member slides along the workpiece and further allows the guide base plate and the cutting tool to continue the cutting process on the workpiece; and (f) means for providing tension so that the slidable means is returned to its initial position after each cutting process on the workpiece is completed; (g) whereby the cutting guide apparatus automatically places the cutting tool in the precise cutting position to achieve an accurate cut every time to expedite the cutting process on the workpiece.

Further defined in detail, the present invention is a cutting guide apparatus for guiding a portable cutting tool in a cutting process to cut a workpiece, the cutting guide apparatus comprising: (a) a guide base plate having an opening on one side for accommodating a cutting blade of the cutting tool; (b) a pair of guide rails affixed on the other side of the guide base plate and located parallel in a lengthwise direction to the opening and spaced above the guide base plate; (c) locking and mounting means to releasably attach the guide base plate to the cutting tool such that the cutting blade of the cutting tool extends downwardly through the opening; (d) slidable means having at least two wheel rims affixed on top of the slidable means and located adjacent to opposite ends and opposite sides of the slidable means, the slidable means slidably disposed between the pair of guide rails such that the at least two wheel rims respectively engage with the pair of guide rails and the slidable means moving along the direction of the cut to guide the cutting tool throughout the cutting process for cutting the workpiece; (e) an abutment member pivotably connected to the slidable means for abutting against the workpiece and partially positioned underneath the guide base plate to maintain the cutting tool in a precise cutting position during the cutting process, the abutment member pivotable upwardly when the cut exceeds the length of the pair of guide rails such that the abutment member slides along the workpiece and further allows the guide base plate and the cutting tool to continue the cutting process on the workpiece; and (f) means for providing tension so that the slidable means is returned to its initial position after each cutting process on the workpiece is completed; (g) whereby the cutting guide apparatus automatically places the cutting tool in the precise cutting position to achieve an accurate cut every time to expedite the cutting process on the workpiece.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A cutting guide apparatus for guiding a portable circular saw in a cutting process to cut a substantially planar workpiece having at least one side and at least one end, the cutting guide apparatus comprising:
   a. a substantially rectangular shaped guide base plate having a rectangular shaped opening on one side for accommodating a cutting blade of said circular saw;
   b. a pair of spaced apart guide rails affixed on the other side of said guide base plate and located parallel in a lengthwise direction to said rectangular shaped opening;
   c. locking and mounting means to releasably attach said guide base plate to said portable circular saw such that the cutting blade of said circular saw extends downwardly through said rectangular shaped opening;
   d. a slidable plate slidably disposed between said pair of guide rails and moving along a direction of the cut to guide said circular saw throughout the cutting process for cutting said workpiece;
   e. an elongated abutment guide member pivotably connected to said slidable plate and having an outer sleeve and an inner rod slidably disposed within said outer sleeve, where the abutment guide member can be positioned in an operative position for abutting against said at least one side of said workpiece and partially positioned underneath said guide base plate to maintain said circular saw in a precise cutting position during the cutting process and is in an inoperative position when the precise cutting position is not required, said abutment guide member pivotable upwardly when the cut exceeds a length of said pair of guide rails such that the abutment guide member slides along the workpiece and further allows said guide base plate and said circular saw to continue the cutting process on said workpiece;
   f. means for holding said abutment guide member in both said operative position and said inoperative position, said means for holding having a biasing means allowing the abutment guide member to extend and to retract with respect to the lengthwise direction to thereby place the abutment guide member in the respective positions; and
   g. means for providing tension so that said slidable plate is returned to an initial position after each cutting process on the workpiece is completed;
   h. whereby said cutting guide apparatus automatically places said circular saw in said precise cutting position to achieve an accurate cut every time to expedite the cutting process on said workpiece.

2. The cutting guide apparatus in accordance with claim 1, further comprising a bearing for engaging with one of said pair of guide rails to hold said abutment guide member in position and assist in a precise movement of said slidable plate along said pair of guide rails.

3. The cutting guide apparatus in accordance with claim 1, wherein said tension means includes an elastic spring.

4. The cutting guide apparatus in accordance with claim 1, wherein said pair of spaced apart guide rails each include an upside down L-shaped configuration.

5. The cutting guide apparatus in accordance with claim 1, where said biasing means includes a coil spring.

6. A cutting guide apparatus for guiding a portable cutting tool in a cutting process to cut a workpiece, the cutting guide apparatus comprising:
   a. a guide base plate having an opening on one side for accommodating a cutting blade of said cutting tool;
   b. track means affixed on the other side of said guide base plate and located adjacent to said opening and parallel to a lengthwise direction of said guide base plate;
   c. locking and mounting means to releasably attach said guide base plate to said cutting tool such that the cutting blade of said cutting tool extends downwardly through said opening;
   d. slidable means slidably disposed on said track means and moving along a direction of the cut to guide said cutting tool throughout the cutting process for cutting said workpiece;
   e. an abutment guide member pivotably connected to said slidable means and including an outer sleeve and an inner rod slidably disposed within said outer sleeve for abutting against said workpiece and partially positioned underneath said guide base plate to maintain the cutting tool in a precise cutting position during the cutting process, the abutment guide member pivotable upwardly when the cut exceeds a length of said track means such that the abutment guide member slides along the workpiece and further allows said guide base plate and said cutting tool to continue the cutting process on said workpiece;
   f. means for positioning the inner rod in an operative position for abutting against said workpiece and in an inoperative position when the precise cutting position is not required, said means for positioning having a biasing means allowing the abutment guide member to extend and to retract with respect to the lengthwise direction to thereby place the abutment guide member in the respective positions; and g. means for providing tension so that said slidable means is returned to an initial position after each cutting process on the workpiece is completed;

h. whereby said cutting guide apparatus automatically places said cutting tool in said precise cutting position to achieve an accurate cut every time to expedite the cutting process on said workpiece.

7. The cutting guide apparatus in accordance with claim 6, further comprising a bearing for engaging with said track means to hold said abutment guide member in position and assist in a precise movement of said slidable means along said track means.

8. The cutting guide apparatus in accordance with claim 6, wherein said guide base plate is generally rectangular shape.

9. The cutting guide apparatus in accordance with claim 6, wherein said track means includes a pair of spaced apart upside-down L-shaped guide rails.

10. The cutting guide apparatus in accordance with claim 6, wherein said tension means includes an elastic spring.

11. The cutting guide apparatus in accordance with claim 6, wherein said biasing means and said inoperative position includes a coil spring.

12. The cutting guide apparatus in accordance with claim 6, wherein said cutting tool includes a portable circular saw.

13. A cutting guide apparatus for guiding a cutting tool in a cutting process to cut a workpiece, the apparatus comprising:

a. a base plate having an opening therethrough for accommodating a cutting blade of said cutting tool;

b. track means affixed on said base plate and located adjacent to said opening;

c. mounting means to releasably attach said base plate to said cutting tool such that said cutting blade of said cutting tool extends downwardly through said opening;

d. slidable means slidably disposed on said track means and moving along a direction of the cut to guide said cutting tool throughout the cutting process for cutting said workpiece;

e. an abutment member pivotably connected to said slidable means and including an outer sleeve and an inner rod slidably disposed within said outer sleeve for abutting against said workpiece and partially positioned underneath said base plate to maintain said cutting tool in a precise cutting position during the cutting process, the abutment member pivotable upwardly when the cut exceeds a length of said track means such that the abutment member slides along the workpiece and further allows said base plate and said cutting tool to continue the cutting process on said workpiece;

f. means for positioning the inner rod in an operative position for abutting against said workpiece and in an inoperative position when the precise cutting position is not required, said means for positioning having a biasing means allowing the abutment guide member to extend and to retract with respect to a lengthwise direction of said base plate to thereby place the abutment guide member in the respective positions; and g. means for providing tension so that said slidable means is returned to an initial position after each cutting process on the workpiece is completed;

h. whereby said cutting guide apparatus automatically places said cutting tool in said precise cutting position to achieve an accurate cut every time to expedite the cutting process on said workpiece.

14. The cutting guide apparatus in accordance with claim 13, further comprising a bearing for engaging with said track means to hold said abutment member in position and assist in a precise movement of said slidable means along said track means.

15. The cutting guide apparatus in accordance with claim 13, wherein said base plate is generally rectangular shape.

16. The cutting guide apparatus in accordance with claim 13, wherein said track means includes a pair of spaced apart upside-down L-shaped guide rails.

17. The cutting guide apparatus in accordance with claim 13, wherein said tension means includes an elastic spring.

18. The cutting guide apparatus in accordance with claim 13, wherein said biasing means for said inner rod in both said operative position and said inoperative position includes a coil spring.

19. The cutting guide apparatus in accordance with claim 13, wherein said cutting tool include a portable circular saw.

20. A cutting guide apparatus for guiding a portable cutting tool in a cutting process to cut a workpiece, the cutting guide apparatus comprising:

a. a guide base plate having an opening on one side for accommodating a cutting blade of said cutting tool;

b. a pair of guide rails affixed on the other side of said guide base plate and located parallel in a lengthwise direction to said opening and spaced above said guide base plate;

c. locking and mounting means to releasably attach said guide base plate to said cutting tool such that the cutting blade of said cutting tool extends downwardly through said opening;

d. slidable means having a plate and two sleeves attached on opposite sides of the plate, the slidable means slidably disposed between said pair of guide rails such that the two sleeves respectively install on and surround said pair of guide rails, where two sleeves slide on said pair of guide rails and said slidable means moving along a direction of the cut to guide said cutting tool throughout the cutting process for cutting said workpiece;

e. an abutment member pivotably connected to said slidable means and including an outer sleeve and an inner rod slidably disposed within said outer sleeve for abutting against said workpiece and partially positioned underneath said guide base plate to maintain said cutting tool in a precise cutting position during the cutting process, the abutment member pivotable upwardly when the cut exceeds a length of said pair of guide rails such that the abutment member slides along the workpiece and further allows said guide base plate and said cutting tool to continue the cutting process on said workpiece;

f. means for positioning the inner rod in an operative position for abutting against said workpiece and in an inoperative position when the precise cutting position is not required, said means for positioning having a biasing means allowing the abutment guide member to extend and to retract with respect to the lengthwise direction to thereby place the abutment guide member in the respective positions; and g. means for providing tension so that said slidable means is returned to an initial position after each cutting process on the workpiece is completed;

h. whereby said cutting guide apparatus automatically places said cutting tool in said precise cutting position to achieve an accurate cut every time to expedite the cutting process on said workpiece.

21. The cutting guide apparatus in accordance with claim 20, wherein said tension means includes an elastic spring.

22. The cutting guide apparatus in accordance with claim 20, wherein said pair of guide rails are generally cylindrical shape.

23. The cutting guide apparatus in accordance with claim 20, wherein said means biasing means and said inoperative position includes a coil spring.

24. The cutting guide apparatus in accordance with claim 20, wherein said cutting tool include a portable circular saw.

25. A cutting guide apparatus for guiding a portable cutting tool in a cutting process to cut a workpiece, the cutting guide apparatus comprising:

a. a guide base plate having an opening on one side for accommodating a cutting blade of said cutting tool;

b. a pair of guide rails affixed on the other side of said guide base plate and located parallel in a lengthwise direction to said opening and spaced above said guide base plate;

c. locking and mounting means to releasably attach said guide base plate to said cutting tool such that the cutting blade of said cutting tool extends downwardly through said opening;

d. slidable means having at least two wheel rims affixed on top of the slidable means and located adjacent to opposite ends and opposite sides of the slidable means, the slidable means slidably disposed between said pair of guide rails such that the at least two wheel rims respectively engage with said pair of guide rails and said slidable means moving along a direction of the cut to guide said cutting tool throughout the cutting process for cutting said workpiece;

e. an abutment member pivotably connected to said slidable means and including an outer sleeve and an inner rod slidably disposed within said outer sleeve for abutting against said workpiece and partially positioned underneath said guide base plate to maintain said cutting tool in a precise cutting position during the cutting process, the abutment member pivotable upwardly when the cut exceeds a length of said pair of guide rails such that the abutment member slides along the workpiece and further allows said guide base plate and said cutting tool to continue the cutting process on said workpiece;

f. means for positioning the inner rod in an operative position for abutting against said workpiece and in an inoperative position when the precise cutting position is not required, said means for positioning having a biasing means allowing the abutment guide member to extend and to retract with respect to the lengthwise direction to thereby place the abutment guide member in the respective positions; and g. means for providing tension so that said slidable means is returned to an initial position after each cutting process on the workpiece is completed;

h. whereby said cutting guide apparatus automatically places said cutting tool in said precise cutting position to achieve an accurate cut every time to expedite the cutting process on said workpiece.

26. The cutting guide apparatus in accordance with claim 25, wherein said tension means includes an elastic spring.

27. The cutting guide apparatus in accordance with claim 25, wherein said pair of guide rails are generally cylindrical shape.

28. The cutting guide apparatus in accordance with claim 25, wherein said biasing means and said inoperative position includes a coil spring.

29. The cutting guide apparatus in accordance with claim 25, wherein said cutting tool include a portable circular saw.

\* \* \* \* \*